(12) United States Patent
Bironneau et al.

(10) Patent No.: US 12,142,919 B2
(45) Date of Patent: Nov. 12, 2024

(54) CONTROL METHOD AND SYSTEM FOR OPERATING AN ELECTRICAL COMPONENT

(71) Applicant: Open Energi Limited, Middlesex (GB)

(72) Inventors: Michael Bironneau, London (GB); James Mackay, London (GB)

(73) Assignee: Open Energi Limited, London (GB)

( * ) Notice: Subject to any disclaimer, the term of this patent is extended or adjusted under 35 U.S.C. 154(b) by 395 days.

(21) Appl. No.: 17/607,750

(22) PCT Filed: Apr. 30, 2020

(86) PCT No.: PCT/GB2020/051064
§ 371 (c)(1),
(2) Date: Oct. 29, 2021

(87) PCT Pub. No.: WO2020/225533
PCT Pub. Date: Nov. 12, 2020

(65) Prior Publication Data
US 2022/0224115 A1    Jul. 14, 2022

(30) Foreign Application Priority Data

May 3, 2019  (GB) ..................... 1906325

(51) Int. Cl.
*H02J 3/14* (2006.01)
*G05B 17/02* (2006.01)

(52) U.S. Cl.
CPC .............. *H02J 3/144* (2020.01); *G05B 17/02* (2013.01); *H02J 2310/64* (2020.01)

(58) Field of Classification Search
CPC ........ H02J 3/144; H02J 2310/64; G05B 15/02
See application file for complete search history.

(56) References Cited

U.S. PATENT DOCUMENTS

| | | | |
|---|---|---|---|
| 8,344,550 B2* | 1/2013 | Delmerico | H02J 3/32 307/82 |
| 2010/0114395 A1* | 5/2010 | Hinatsu | C25B 15/02 700/295 |

(Continued)

FOREIGN PATENT DOCUMENTS

| | | |
|---|---|---|
| GB | 2361118 A | 10/2001 |
| GB | 2725455 A1 | 4/2014 |

(Continued)

OTHER PUBLICATIONS

International Search Report and Written Opinion of the International Searching Authority for International Application No. PCT/GB2020/051064, dated Sep. 7, 2020 and having a mailing date of Sep. 16, 2020, pp. 1-18.

*Primary Examiner* — Nicholas Klicos
(74) *Attorney, Agent, or Firm* — Carmody Torrance Sandak & Hennessey LLP

(57) ABSTRACT

A control method and system for operating an electrical component from an electrical distribution network maximises the advantage to be gained from the component simultaneously following two power-consumption strategies. The first strategy D(t) is relatively slow-moving, for example increasing consumption when electricity prices are lower, whereas the second F(t) requires fast-moving adjustments, for example when providing a frequency responsive service to counter network power imbalances. The method involves operating the component to follow a strategy with the fast-moving function F(t) superimposed on a baseline power function B(t), with B(t) derived from the slow-moving function D(t). In applying the invention to a binary component (i.e. one that is either "off" or "on") that is providing the responsive service as part of a group of such components, B(t) is derived both from D(t) and also from past values of F(t). The effect of F(t) is mitigated by (Continued)

determining the value of B(t) for each of a sequence of subintervals by a method that takes into account its contribution to power consumption in all previous subintervals.

15 Claims, 3 Drawing Sheets

(56) References Cited

U.S. PATENT DOCUMENTS

| | | | | |
|---|---|---|---|---|
| 2013/0006431 A1* | 1/2013 | Marroyo Palomo | .. | G06Q 10/06 700/287 |
| 2013/0035802 A1* | 2/2013 | Khaitan | ................. | G05B 15/02 700/297 |
| 2014/0285010 A1* | 9/2014 | Cameron | ................. | H02J 7/35 307/29 |
| 2014/0336835 A1* | 11/2014 | Bloor | ...................... | H02J 3/003 700/295 |
| 2015/0019034 A1* | 1/2015 | Gonatas | ................. | H02S 10/00 700/291 |
| 2016/0013676 A1 | 1/2016 | Kaji et al. | | |
| 2016/0091912 A1* | 3/2016 | Stanlake | ................... | G05F 1/66 700/295 |
| 2016/0226249 A1* | 8/2016 | Sakuma | ............ | H02J 13/00034 |
| 2016/0261116 A1* | 9/2016 | Barooah | ................. | F24F 11/77 |
| 2016/0294215 A1* | 10/2016 | Kudo | ........................ | H02J 3/32 |

FOREIGN PATENT DOCUMENTS

| | | |
|---|---|---|
| JP | 3382298 A1 | 10/2018 |
| WO | WO2006128709 A2 | 12/2006 |
| WO | WO2006128709 A3 | 12/2006 |
| WO | WO2013017896 A3 | 2/2013 |
| WO | WO2018066037 A1 | 4/2018 |
| WO | WO2019054120 A1 | 3/2019 |

* cited by examiner

CONTROL METHOD AND SYSTEM FOR OPERATING AN ELECTRICAL COMPONENT

CROSS-REFERENCE TO RELATED APPLICATIONS

This application is a U.S. national phase under 35 U.S.C. Section 371 and claims the benefit of and priority to International Application No. PCT/GB2020/051064, filed Apr. 30, 2020, inventors Michael Bironneau et al., titled "A Control Method and System for Operating an Electrical Component", which claims the benefit of and priority to Great Britain Patent Application No. GB 1906325.4, filed May 3, 2019, inventors Michael Bironneau et al., titled "A Control Method and System for Operating an Electrical Component", which are commonly assigned herewith, and all of which are hereby incorporated herein by reference in their entireties with the same full force and effect as if set forth in their entireties herein.

FIELD OF THE INVENTION

This invention relates to a method and system adapted to control the operation of electrical components, both generators and loads, that are coupled to an electrical power supply network in order to enable the components to participate simultaneously in two different power consumption or generation strategies.

BACKGROUND OF THE INVENTION

It is of particular relevance to electrical loads of a type that have some mechanism for storing energy and that therefore tend to be operated to minimise energy consumption during peak pricing periods or during periods that, for some other reason, attract a financial penalty. It is of similar relevance to generators that are able to hold power in reserve, which permits scheduling of the times at which generated power is fed into the network in order to maximise revenue. The present invention allows such practices to become compatible with the provision of a service that assists in balancing electrical supply with demand.

In any electrical power distribution network, it is important to balance the power supplied to the network with that drawn from it. Any imbalance, even on a short term, can result in problems ranging from a drop in efficiency of power transmission, unpredictable fluctuations in electricity supply to more severe effects such as power blackouts.

A modern electricity network, such as the UK National Grid, is balanced on a second by second basis with a great deal of sophistication. Any imbalance between power generation and power consumption by loads on the network is manifest in a deviation of an operational characteristic of the electricity supply from its set, intended, value. Monitoring such a parameter enables imbalances to be detected and therefore corrected. Most commonly, it is the frequency of electricity supplied by the Grid that is monitored for this purpose. In the UK, mains electricity is supplied at 50 Hz. If the aggregated loads on the network draw more power than supplied, the frequency will drop. Broadly speaking, this effect can be understood as increasing load on a generator causes the generator to run (rotate) slower. Conversely, if an imbalance is caused by over-generation, the frequency will rise above its nominal 50 Hz value.

There are numerous factors that may cause an imbalance in a power network. They may be supply-side, for example technical problems at a generator, or demand-side, for example a surge in demand during a televised sporting event. In either case, corrections may be applied by adjusting power generated or consumed. To correct on the supply side, the network generally has available to it a backup system of assets (generators) that can come online or disconnect from the grid on request. On the demand side, the network will additionally have a mechanism by which at least a selection of loads on the network can be operated at different power levels. Response may be dynamic, operating in response to the second by second changes in operating frequency or non-dynamic, which is usually a discrete service triggered in response to a pre-defined frequency deviation. In the UK, providers of balancing services to the Grid network carry out their own monitoring of frequency deviations. In other jurisdictions, the network operator itself monitors for signs of imbalance and will communicate with providers, directly indicating the balancing service required. Financial incentives are offered by the network operator to generators and loads that are willing and able to provide balancing services.

With the shift from 100% coal-powered electricity generation to renewable forms of energy, the task of maintaining a predictable level of supply is made more difficult. Whilst a power station would generally only go offline in the relatively unlikely event of a breakdown, renewable sources are fundamentally less reliable. Wind farms are less productive if the wind is low; they must also shut down in the event of particularly high winds; solar energy generation is reduced in the event of cloud and hydro-electric generation is also reliant on the weather. The level of supply is, like demand, therefore becoming more difficult to predict. This has prompted an increased requirement for balancing provided by the demand side of the distribution network. Overall, there is a need for a flexible balancing system that is rapidly responsive to imbalances.

On a practical level, a grid network must incorporate a range of mechanisms for power adjustment. For this invention, a distinction is drawn between those components that are operable with a fully variable power consumption, for example a battery, and those binary components, such as refrigerators, that can only operate at two power levels: on and off. These components can both provide a balancing service to the grid, but the mechanisms are different.

One power-adjustment mechanism using a battery system is described in US2016/0013676. The battery increases or decreases power supplied to a network (or withdrawn from the network) in order to counter deviations in network frequency from a nominal value. A battery has the capacity to store charge, and hence energy, within. Thus a measurement of the state of charge (SoC) of the battery provides an indication of the availability of the battery to respond to network imbalances. Generally, a battery that is participating in a frequency responsive service will be continuously providing this service, unless its SoC moves outside a predefined range.

Another mechanism may be provided by a group of loads that can be operated for short periods at reduced power, without noticeable drop in performance. Aggregated responses, usually in sub-groups of the available responsive loads, contribute to balancing supply and demand. Sub-groups are selected such that reduced power is demanded from individual loads only for a limited period of time. This mechanism allows a portfolio of electrical assets to participate in responsive services as a group, even though no individual asset would, in itself, meet the technical criteria set by the grid network to provide such a service.

Exemplary methods that facilitate the participation of binary loads in a frequency-responsive service are described in GB 2361118, WO 2006/128709 and WO 2013/017896 (the "Open Energi FFR algorithms"). These documents all describe selection algorithms that may be used to determine which loads from within a large group of binary loads are to provide the response that is needed at any given time. The group of loads is under the control of an autonomous device that operates independently of external control. When the control device detects an imbalance in grid frequency, it alters the power consumed by the electrical loads with which it is integrated in order to counter the imbalance detected across the network. Power consumption is altered by allowing energy stored within the load to change. That is, each load has an energy storage capacity that varies with respect to the load's duty cycle. The energy storage capacity of the electrical load enables occasional adjustment of the load's energy consumption without significantly compromising the operational performance of the electrical load. For each electrical load, energy storage capacity thresholds govern when an electrical load is available to contribute to the responsive load service.

With the above prior art algorithms, selection of the electrical loads to deliver a responsive load service in response to a detected imbalance of the network is performed through the use of frequency triggering thresholds assigned to each load by the control device. Thresholds may vary smoothly or discretely with time and they may be determined taking into account a number of factors such as the amount of energy stored in the load at the time that the response is required, time elapsed since the load was last called upon to provide a responsive load service and the nature of recent fluctuations in grid frequency.

The greater the number and variety of electrical components that are available to participate in a balancing service, the better the balance that can be struck between providing a service to the distribution network and minimising any deleterious effect on the normal operating behaviour of each component. Moreover, there are many industrial processes that draw a large amount of power from electricity supply networks and if these could be given the opportunity to provide a responsive load service, the benefit to the network would be significant.

There is however a major economic obstacle to implementing a frequency responsive service for a number of components that may be connected to the grid, which arises through electricity pricing strategies. For example, it generally costs more for a load to consume electricity at certain, peak, times of the day. This has encouraged many loads of the type that are able to store reserves of energy to participate in "peak-price-avoidance" or "revenue stacking" behaviour. That is, they will increase their power consumption just prior to a peak period in order to allow stored energy to increase towards its maximum permitted value. During the peak period, these reserves of energy will be drawn upon in preference to electrical power from the network. Reduction in electricity consumption during a peak period enables an overall reduction in the economic cost of operating the load.

A similar consideration arises for those types of electricity generators that are able to vary the amount of energy that is stored in reserve. For example, it is often desirable to exploit the energy storage capacity of a battery to ensure that power is supplied to the network at times when it is most financially advantageous to do so and, as with the load, this is considered incompatible with operation of a frequency responsive service.

The prior art battery storage system of US2016/0013676 describes an improvement to a basic frequency-responsive service that makes it more likely that the battery SoC is kept within a range for which the responsive service may be offered. This is achieved by allowing the battery to charge/discharge when its SoC moves away from a central range and making a frequency-responsive adjustment to the power level of the charging or discharging operation. This however is an internal management system, which has limited application to a storage battery and takes no account of the effect of providing the frequency responsive service on ideal SoC management.

There is a perceived need for an alternative implementation strategy for a system responsive to network imbalances that allows the participation of components that, at the same time, are operated in accordance with some other electrical-power consumption scheme.

SUMMARY OF THE INVENTION

The present invention accordingly provides a method of controlling operation of a component connected to an electricity supply network, the component being either a generator or load of a type that is able to store energy within. The method comprises the steps of:
(a) Operating the component over a time period such that, within the time period, adjustments are made to a rate at which energy is transferred between the component and the supply network in accordance with a baseline power function $B(t)$; and
(b) Simultaneously operating the component over the time period such that adjustments are, in addition, made to the rate at which energy is transferred between the component and the supply network in accordance with a fast-moving power function $F(t)$, such that the fast-moving power function $F(t)$ is superimposed on the baseline power function; wherein
the baseline power function $B(t)$ is derived from a slow-moving power function $D(t)$, wherein if adjustments are made to the rate at which energy is transferred between the component and the supply network in accordance with the slow-moving power function $D(t)$, the component would benefit economically from a variation in a prevailing price of electricity on the network or a variation in a value that can be derived, directly or indirectly, from the supply of electricity on the network; and
adjustments made to the rate at which energy is transferred between the component and the supply network in accordance with the fast-moving power function $F(t)$ are adjustments that are responsive to and such as to counter imbalances between power generation and power consumption over the electricity supply network.

With this invention, the fast-moving power function $F(t)$ is superimposed on the baseline power function $B(t)$, which in turn is derived from the slow-moving power function $D(t)$. This allows the component (generator or load) to simultaneously follow two different power-consumption strategies, with the baseline function $B(t)$ being determined such that the cost of deviating from the slow-moving power function $D(t)$ is acceptable. In particular, the slow-moving power function $D(t)$ is determined by financial forces within the electricity market. For example, it may be prevailing price, which leads to a strategy such as peak-price avoidance. Alternatively, it may be based on a market derivative such as a penalty value that is imposed on a load operator for breaching contractual obligations with the network. The load operator will then try and limit operation to avoid or reduce exposure to that penalty.

For a variable-speed generator or load, operable at a range of power levels between zero and a maximum power $C_D$, the baseline power function B(t) may be set such that it is equal to the slow-moving power function D(t), provided that the adjustments that are responsive to network imbalances have a high probability of being much less than the maximum power $C_D$. Further, B(t) may be set such that it is equal to the slow-moving power function D(t) unless D(t) is within a range $\delta C_D$, $\delta \ll 1$ of either 0 or the maximum power $C_D$ and, if D(t) is within this range, B(t) is set to either $\delta C_D$ or $(1-\delta)C_D$ respectively.

An alternative embodiment of the method of this invention is for implementation with binary components that are either "off" or "on" and so operable only at two power levels: 0 and $C_D$. Each binary component is one of a group of components that are together operated to provide a service that is responsive to network imbalances, with responsibility for response being distributed around the group such that each component will, with high probability, only provide the responsive service intermittently. In this implementation, the baseline power function B(t) is derived both from the slow-moving power function D(t) and also from past values of the fast-moving power function F(t).

With this embodiment, the time period preferably comprises a sequential series of settlement periods and, for each settlement period, k=1 to N, following determination of the average value $\hat{D}_k$ of the slow-moving power function D(t) over that settlement period, the baseline function B(t) is derived using the steps of:

a) Dividing the settlement period $T_k$ into a sequential series of subintervals;

b) For each subinterval period $s_m$, m=1 to M if, at the start of the subinterval period $s_m$, the component is not responding to a network imbalance:
  (i) Determine the average total power transfer $\hat{P}_k$ between the component and the supply network prior to the start of that subinterval period;
  (ii) Compare the average total power transfer $\hat{P}_k$ prior to the subinterval and determined in Step (b)(i) with the average value $\hat{D}_k$ of the slow-moving power function D(t) over the settlement period; and
  (iii) If $\hat{P}_k > \hat{D}_k$ set the baseline function B(t) for that subinterval to zero; if $\hat{P}_k < \hat{D}_k$ set the baseline function B(t) for that subinterval to the maximum power $C_D$.

In this way, the effect of F(t) is mitigated by determining the value of B(t) for each subinterval by a method that takes into account its contribution to power consumption in all previous subintervals. Over the settlement period therefore, the deviation from the ideal slow-moving power function will be limited to the deviation exhibited in a single subinterval.

Further if, at the start of the subinterval period $s_m$, the component is responding to a network imbalance, the baseline power function B(t) for the subinterval period $s_m$ is preferably set to the same value as the baseline power function B(t) for the immediate preceding subinterval $s_{m-1}$.

In a second aspect, the invention provides a method of operating a component connected to an electricity supply network, the method including adjusting a rate at which energy is transferred between the component and the electricity supply network in accordance with a power function P(t), the power function comprising two components: a fast-moving power function F(t) and a baseline power function B(t), wherein the baseline function B(t) is derived by the following steps:

(a) for a settlement period $T_k$, deriving an average value $\hat{D}_k$ of a slow-moving power function D(t);

(b) dividing the settlement period $T_k$ into a sequential series of subintervals $s_m$, m=1 to M;

(c) For each subinterval period $s_m$, m=1 to M:
  (i) if F(t)≠0 at the start of the subinterval period $s_m$, leave the value of B(t) unchanged for that subinterval, $B_m = B_{m-1}$; otherwise:
  (ii) Determine the average total power transfer $\hat{P}_k$ between the component and the supply network within the settlement period $T_k$ and prior to the start of that subinterval $s_m$ period;
  (iii) Compare the average total power transfer $\hat{P}_k$ prior to the subinterval $s_m$ and determined in Step (c)(ii) with the average value $\hat{D}_k$ of the slow-moving power function D(t) over the settlement period; and
  (iv) If $\hat{P}_k > \hat{D}_k$ set the baseline function for that subinterval $B_m$ to zero; if $\hat{P}_k < \hat{D}_k$ set the baseline function for that subinterval $B_m$ to a maximum power $C_D$, otherwise leave the baseline function unchanged for that subinterval, $B_m = B_{m-1}$.

A method of controlling operation of a non-battery component connected to an electricity supply network, the component being either a generator or load of a type that is able to store energy within, the method comprising the steps of:

(a) Monitoring a physical parameter of the component that is indicative of the energy reserves stored within;

(b) Deriving a proxy variable $\phi$, $0 \le \phi \le 1$, from the measured physical parameter, the proxy variable $\phi$ representing the fraction of stored energy held in the energy reserves at any point in time;

(c) If the proxy variable $\phi$ has a value that is between an upper threshold limit and a lower threshold limit, controlling operation of the component in accordance with a slow-moving power function D(t), wherein if adjustments are made to the rate at which energy is transferred between the component and the supply network in accordance with the slow-moving power function D(t), the component would benefit economically from a variation in a prevailing price of electricity on the network or a variation in a value that can be derived, directly or indirectly, from the supply of electricity on the network; and (d) If the proxy variable $\phi$ has a value that is outside the upper or lower threshold limits, operating the component with an operating power that is in accordance with returning the parameter to a value between the upper and lower threshold limits.

Use of the proxy variable as an indicator of energy stored within the load allows the regulation of the power consumption of the component to be separated from a detailed knowledge of component operation. The proxy variable is, in this way, analogous with a battery SoC. This provides great flexibility in application of power consumption functions to all manner of generators and loads. Moreover, the proxy variable model is flexible when applied to systems in which more than one parameter should properly be used to provide an indication of component energy reserves. An overall proxy variable may, in such cases, be defined as a product of the respective individual-parameter proxy variables.

In an alternative aspect, the present invention provides a method of controlling operation of a component connected to an electricity supply network, the component being either a generator or load of a type that is able to store energy within, the method comprising the steps of:
   a) Monitoring a physical parameter of the component that is indicative of the energy reserves stored within;
   b) If the parameter has a value that is between an upper threshold limit and a lower threshold limit, controlling operation of the component in accordance with the method set out above; and
   c) If the parameter has a value that is outside the upper or lower threshold limits, operating the component with an operating power that is in accordance with returning the parameter to a value between the upper and lower threshold limits.

In this aspect, the invention provides a convenient approach to ensuring that simultaneous operation of the component in accordance with two power consumption strategies does not cause the component to operate outside its acceptable parameters.

Preferably, this method is based on the use of proxy variables. A proxy variable $\phi$, $0 \leq \phi \leq 1$, is derived for the component, the proxy variable representing the fraction of storable energy held in the energy reserves at any point in time and being derived from the measured physical parameter, whereby threshold limits of component operation are defined in terms of the proxy variable.

In another aspect, the present invention provides a system for controlling operation of a component connected to an electricity supply network, the component being either a generator or load of a type that is able to store energy within, the system comprising:
   an industrial process controller arranged to exert direct control over operation of the component and to monitor process parameters;
   a central demand server arranged to derive a slow-moving power function D(t), wherein if adjustments are made to the rate at which energy is transferred between the component and the supply network in accordance with the slow-moving power function D(t), the component would benefit economically from a variation in a prevailing price of electricity on the network or a variation in a value that can be derived, directly or indirectly, from the supply of electricity on the network;
   an indicator arranged to provide a signal indicative of imbalances in power supplied over the network; and
   a local device controller associated with the industrial process controller and component and arranged:
      to receive the signal indicative of imbalances in power supplied over the network from the indicator and the slow-moving power function D(t) from the central demand server;
      to derive a baseline power function B(t) from the slow-moving power function D(t),
      to derive a fast-moving power function F(t) from the signal indicative of imbalances in power supplied over the network; and
      to provide the industrial process controller with instructions to operate the component such that adjustments are made to a rate at which energy is transferred between the component and the supply network in accordance with the fast-moving power function F(t) superimposed on the baseline power function B(t).

In another aspect, the present invention provides a local device controller associated with an industrial process controller arranged to exert direct control over operation of a component connected to an electricity supply network, the component being either a generator or load of a type that is able to store energy within, the local device controller being arranged:
   to receive a signal indicative of imbalances in power supplied over the network from an indicator and to receive a slow-moving power function D(t) from a central server;
   to derive a baseline power function B(t) from the slow-moving power function D(t),
   to derive a fast-moving power function F(t) from the signal indicative of imbalances in power supplied over the network; and
   to provide the industrial process controller with instructions to operate the component such that adjustments are made to a rate at which energy is transferred between the component and the supply network in accordance with the fast-moving power function F(t) superimposed on the baseline power function B(t); wherein
   the slow-moving power function D(t) is derived such that if adjustments are made to the rate at which energy is transferred between the component and the supply network in accordance with this function D(t), the component would benefit economically from a variation in the price of electricity distributed by the network during the course of a day.

BRIEF DESCRIPTION OF THE DRAWINGS

The invention will now be described, by way of example only, and with reference to the accompanying drawings, in which.

DETAILED DESCRIPTION OF REPRESENTATIVE EMBODIMENTS

Figure 1:
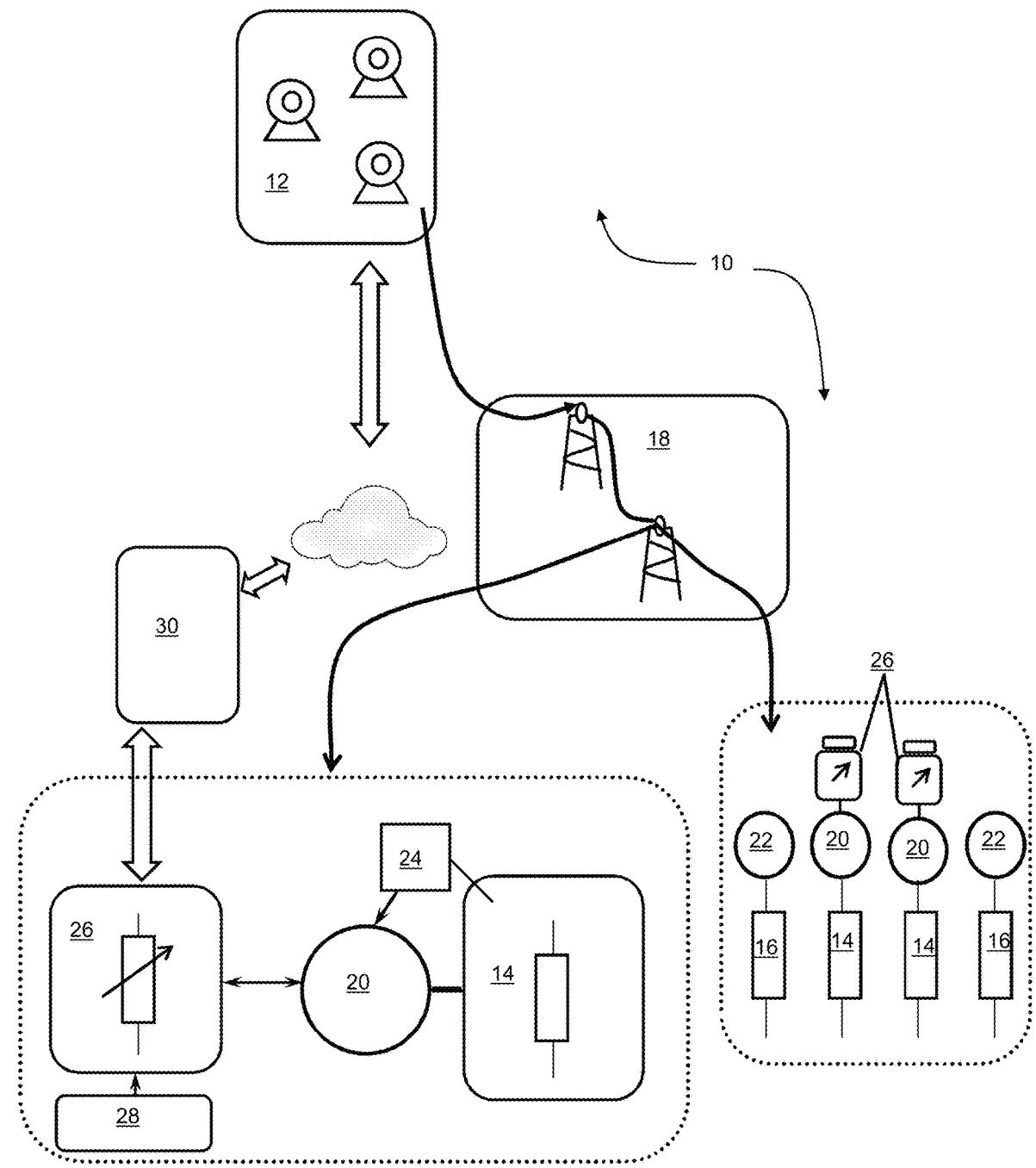
FIG. 1 shows an electricity supply system incorporating a responsive load that may be operated with a power-consumption strategy that is in accordance with the present invention.

An electrical power supply system indicated generally by 10 is illustrated in FIG. 1. The electrical power supply system 10 comprises one or more power generators 12 and a plurality of electrical loads 14, 16. The power generators 12 supply electrical energy to the electrical loads 14, 16 via an electrical power distribution network 18 (hereinafter "the network 18").

In this specific embodiment, the generators are not considered to be providing a service in accordance with this invention. This is not because they are incapable, it is simply for convenience. It will be clear to one skilled in the art that, if a generator satisfies suitable performance criteria, it will be possible to implement this invention with that generator. In what follows however, the description will focus on load operation.

Although represented together in FIG. 1, the power generators 12 are not to be considered of the same type. Some may be coal power stations, others wind farms, hydroelectric generators, or any of a number of known systems that are capable of generating electricity and supplying it to a network. In general, each generator will have an arrangement with the network manager to supply a set amount of electricity to the network. This set amount may be adjusted in accordance with the contractual requirements of the generator in order to provide a degree of balancing to the grid.

Electrical loads 14, 16 are still more varied in their nature. Generally, they draw power from the grid on demand and only a limited subset are capable of providing a response service to counter network imbalance. Those that are capable however may be adapted on an individual basis or as an aggregate of a plurality of loads that are operated collectively to provide a responsive load service, which adapts to assist in balancing network supply and demand.

In the case of electrical loads, this present invention is concerned primarily with loads that are significant consumers of electricity. This will include, for example, industrial processes, electric vehicles as well as heating and refrigeration systems. There is no technical reason however why this invention cannot be implemented with loads that consume less electricity, it is simply that the economic benefit to such a load is unlikely to outweigh the cost.

There is clearly a financial incentive for electrical loads to minimise power drawn from the grid at times when cost is high. Loads that have a capacity to store energy in some form within are, during periods of peak pricing, able to draw on energy reserves that have been built up as a result of increased consumption just prior to the peak period. A battery is a straightforward example, which permits variation in the level of charge it holds whilst retaining its capability to supply power to the grid. Another example is a Building Management System (BMS), which maintains building temperature within a range centred on a nominal set point. The system can therefore be considered to be storing energy if the building temperature is above the minimum value of this range.

The loads 14, 16 shown in FIG. 1 are industrial process loads, which have a capacity to store energy. Other loads and load types may, of course, also be connected to the network, but these are not shown in the Figure. Industrial process loads 14, 16 are all associated with a local industrial process controller 20, 22. The industrial process controller 20, 22 is generally responsible for controlling and monitoring the performance of the load. To this end, it will include, or be in communication with, an appropriately positioned detector 24 that is arranged to monitor a parameter that is indicative of the energy reserves stored within the load. This enables the process controller to ensure that the energy reserves are maintained within a permissible range throughout the process.

The details of the detector 24 will depend on the particular industrial process that provides the load 14. It will be adapted to measure a parameter that will, necessarily, depend on load characteristics and, in particular, the form in which energy is stored in the load. Using the above examples, a battery will have a controller that is adapted to infer its instantaneous State of Charge (SoC) from observation of the voltage at which the battery charges or discharges. On the other hand, the detector 24 for a BMS will include a thermometer, thermocouple or similar device to measure the temperature of the building that is under its control. With other industrial process loads in which more then one parameter is needed to provide a reliable indication of energy reserves, it may be appropriate to have two or more detectors 24 associated with each industrial process controller 20, 22.

The difference between the two types of loads and controllers shown in FIG. 1 is that a first type 14, 20 is adapted to participate in a responsive load service that is being provided to the network 18. Other loads 16, 22 are not. In this embodiment it is assumed that the responsive industrial loads 14 are binary loads among a group of responsive loads that collectively provide the service. The loads 14 within the group may be the same or different. Regardless of the details of the group components, at any time at which a response to an imbalance is demanded, a single load or sub-group of loads will be called upon to provide the response on behalf of the group. There are many selection algorithms that are known in the prior art that may be employed to determine which particular load or sub-group of loads provide the response at any one time. Non-limiting examples are provided by the Open Energi FFR algorithms, referenced above. Selection may be on the basis of previous response demands made on each load, load internal parameters and the degree of imbalance detected in the network. The details of these algorithms are not so important to this invention as their effect. The vast majority seek to distribute response demands evenly amongst the whole group of loads, ensuring that each respective load bears a similar cost in terms of its reduction in normal operating performance. In such a situation, a typical duration of a responsive load "switch" i.e. the time for which a particular load within the portfolio is required to adjust its consumption as a result of network imbalance will be of the order of a few minutes.

The algorithms for binary load operation that are suitable for use with this invention are those that have as a corollary of the even distribution of demand, the effect of low utilisation of each individual load within any "settlement" period. In this context, a settlement period is a period of time that is long relative to the duration of a typical responsive load switch, but much shorter than a day. For example, a settlement period of 30 minutes is appropriate for FFR. For a portfolio of binary loads over a long period of time (many settlement periods), the demand made on the group as a whole for a responsive service will always be a small fraction of the total electricity consumption of the group. This present invention, which allows a responsive service to be implemented alongside some other slower-moving electricity consumption strategy, requires, in addition, that the fraction of time within any settlement period for which an individual load is called upon to provide a response service is low. This is the case with the algorithms described in the above-referenced prior art, but it is not universal.

For non-binary, or variable-speed, loads, the requirements are different. Such loads will continuously adjust their operational power to counter network imbalances. They will not therefore be part of a portfolio of loads in which each load is only called upon intermittently to provide a response. Rather, the low-utilisation condition in this instance is that the responsive service will, at all times, be provided using only a small fraction of the total electricity consumption of the load.

Each responsive load 14 and industrial process controller 20 is associated with a local responsive load controller 26. The responsive load controller 26 is connected to and in communication with the process controller 20, with which it works co-operatively. The local responsive load controller 26 includes, or is connected to, a frequency monitor 28, which is adapted to monitor the frequency of electricity supplied by the network. The term "local" is used to indicate that the controllers 26 are physically close to, or even integral with, the loads 14 under their control. With components that are intended to respond on a second by second basis to network 18 imbalances, it is important to minimise communication delays. In some embodiments (not shown) a plurality of electrical loads 14 may be controlled collectively as a group by a single load controller 26.

Monitoring transitory fluctuations in frequency is the currently preferred approach to detecting imbalances in the power supply across the network 18 but alternative monitors adapted to detect fluctuations in other characteristics of the electricity supply network 18, which are representative of imbalances in the power supplied across the network 18, are envisaged and may be substituted for the frequency monitor 28. In alternative embodiments, suitable for markets such as the PJM distribution network in the US and the AEMO network in Australia, the frequency monitor 28 may be replaced by a receiver. Both these networks are self-monitoring in that the network operator detects imbalances. Algorithms to determine the degree of imbalance, or at least the degree of correction required, may be more complex than simply monitoring how far grid frequency deviates from a nominal value. For example, a factor may be included that takes into account the rate of change of frequency. Once an imbalance is detected however, the network will send a signal to any load that is required to adjust its power consumption in response. This present invention may be implemented with any responsive algorithm that ensures, with high probability, that any individual load is only required to provide its responsive service for a small fraction of time within a settlement period.

The local load controller 26 is adapted to send commands relating to load power consumption to the industrial process controller 20. If this requires an adjustment of power consumption, for whatever reason, this will be implemented by the process controller 20, provided load energy reserves are maintained within an acceptable operating range. If the load energy reserves are outside this range, or if the adjustment to power consumption requested by the local load controller 26 will take it outside this range, the industrial process controller 20 will no longer respond to local load controller 26 signals and will proceed to operate the load 14 independently. Moreover, it will signal to the local load controller 26 that the load 14 is no longer available to provide a responsive load service.

The local load controller 26 is also adapted to monitor network frequency, as detected by the frequency monitor 28 or otherwise.

In this embodiment of the invention, the loads provide their responsive service in accordance with an algorithm that assigns trigger frequencies to each load within the portfolio. The distribution of demand response is ensured by regular reassignment of trigger frequencies. The local load controller 26 is therefore also adapted to retain information as to the trigger frequency at which the load 14 is to switch from normal operation to one that is responsive to a network frequency deviation. If network frequency deviates from its nominal value to an extent that the load's trigger frequency is exceeded, the local load controller 26 will send a signal to the industrial process controller 20 indicating that a responsive service is demanded and (if required) the level of the response. Similarly, the local load controller will determine when a responsive load service is no longer required and notify the industrial process controller 20 to return to a previous level of operation. The industrial process controller 20 is adapted to report load process parameters, for example stored energy reserves, to the local load controller 26.

The local load controller 26 includes a communications interface that is adapted for bidirectional communication. This enables the exchange of data over a network between the local load controller 26 and a remote central demand server 30. The central demand server 30 may be in communication with a plurality of local load controllers 26. The data signals sent by the central demand server 30 relate to power management in accordance with a relatively slowly-varying criterion. In this embodiment of the invention, it relates to a peak-price-avoidance strategy. Unlike the responsive load service, the adjustments to power consumption made while engaging in peak-price avoidance are known days, weeks or months in advance. In comparison, any timing delay on information transmission over a network is negligible. This means that a single central demand server 30 may provide information on power adjustments to many local load controllers 26 over the network. The adjustment pattern requested is tailored to the specific operating requirements of each load 14, as will be explained in more detail below. Data provided by the local load controller 26 to the central demand server 30 may, for example, include information relating to the instantaneous total power consumed by the load. Over time, this will enable the central demand server 30 to record and analyse load power consumption patterns and so to verify the success or otherwise of the responsive load and peak-price avoidance strategies.

FIG. 2 illustrates graphically the variation of power consumption patterns over a few hours for a load when operating (a) a demand-side frequency responsive service and (b) a peak price avoidance scheme. Each graph 34, 36 plots power consumption by a variable-speed load device (or aggregated group of binary loads) against time in the day.

Figure 2A:
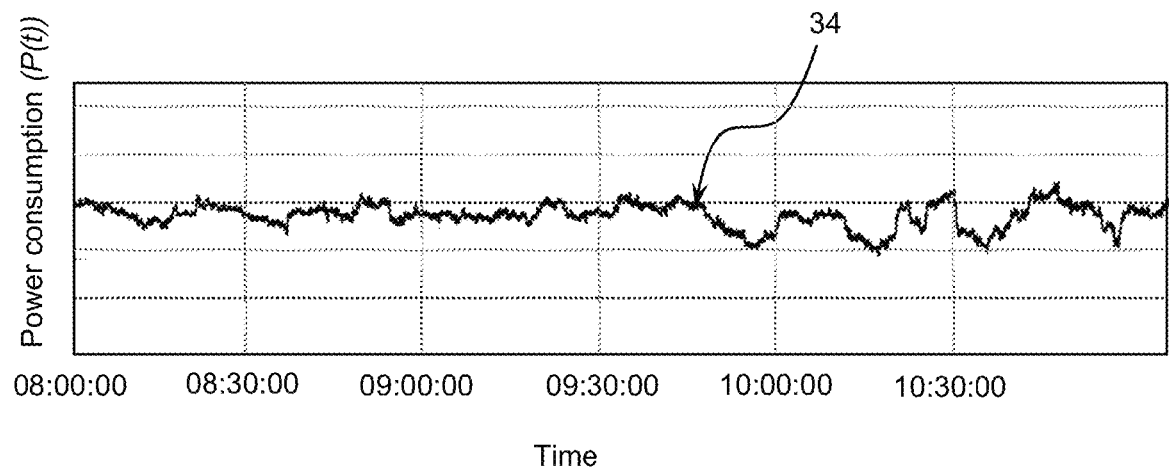
FIG. 2a is a representative graph of power consumption against time for a load device, or aggregated group of devices, providing a frequency-responsive service to a supply network.

With reference to FIG. 2a, it is noted that many electricity distribution system operators, in Europe and elsewhere, require stabilisation measures to commence as soon as the grid frequency deviates by more than 0.01 Hz from the target frequency of 50 Hz. In the system 10, the frequency of the grid is monitored by the frequency monitor 28. If the grid frequency rises to 50.01 Hz, or falls to 49.99 Hz, this threshold is noted and at least one of the load controllers 26 responds by adjusting the power consumption of its respective load 14 to counteract the frequency shift. In the UK, providers of a responsive load service are required to satisfy a number of specific performance criteria. For example, to meet the conditions of a Firm Frequency Response (FFR), providers are required to come online within 10 or 30 seconds of detecting a frequency deviation and to be available to provide a minimum 1 MW of response energy. Enhanced Frequency Response (EFR) is a service that can provide a full power adjustment at 1 second (or less) of registering a frequency deviation. As the grid frequency is monitored on a second-by-second basis, FFR and EFR providers in the UK will potentially be changing the aggregated load power consumption on a similar timescale. This is reflected in the rapid fluctuations in total power consumption 24 of the aggregated devices operating an FFR service, as observed in FIG. 2a.

Figure 2B:
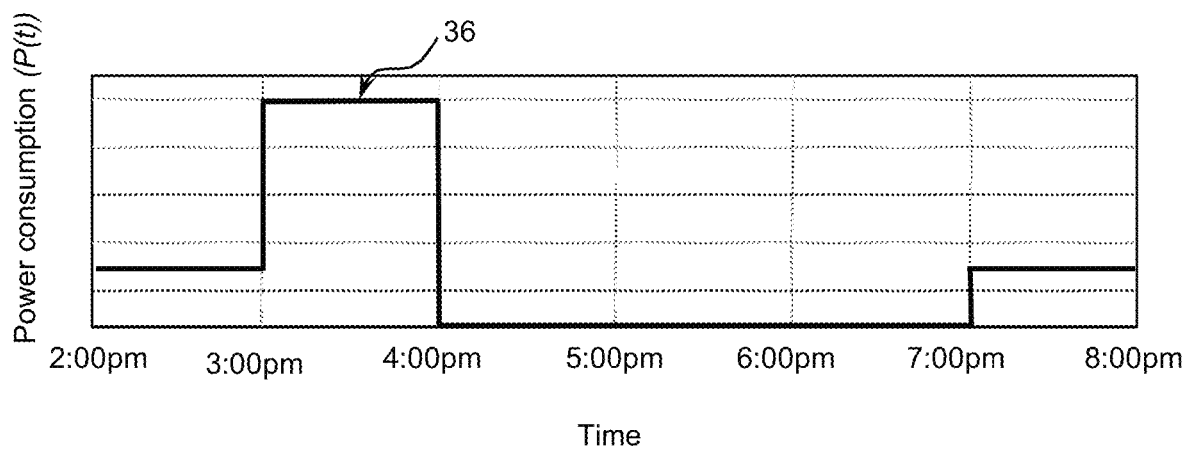
FIG. 2b is a representative graph of power consumption against time for a load device practising peak-price avoidance.

With reference to FIG. 2b, the power consumption of an exemplary load operating with peak-price avoidance is shown. For this grid system, electricity consumed between 4 and 7 pm costs more than at other times of the day. The usual power consumption level of this load, as it operates to its specification, is at a level shown between 2 and 3 pm and 7 and 8 pm. At 3 pm however, the device is run at its maximum power for 1 hour. This enables it to store sufficient reserves of energy that it can afford to operate at zero power consumption between the peak hours of 4 and 7 pm. It then returns to normal operating power. Of course, this is just an example of behaviour that enables peak-price avoidance. The specific details will depend on the load concerned. For example, it might require longer than one hour at maximum power to build up full energy reserves. Energy reserves may not be sufficient to maintain operation at zero power consumption throughout the peak period and so some form of reduced-power operation is required. Moreover, the load may be operated at a higher power consumption after the peak period in order to build up a depleted energy store. Regardless of the specific detail, it can be seen that peak-price avoidance results in a slowly time-varying power consumption profile 36.

Peak-price avoidance is not the only behaviour that results in a slow-moving variable power consumption. In this context, "slow-moving" normally means that there should be no more than one change every 30 minutes, whilst "fast-moving" can change every second. Most electricity distribution networks offer multiple markets in which they purchase power and the right to demand a flexible response from both generators and loads. Incentives are given and penalties imposed on providers to encourage operation within their contracted limits. Although participation in the responsive frequency market will require a rapid response, a number of other markets will only require power consumption to be varied in a slow-moving pattern. For example, to participate in Day-ahead optimisation, power is purchased at a price that is set a day in advance of its use and so operating power levels are set to match the purchased amount. The balancing mechanism service provides a manually-instructed response to correct forecast errors and unexpected losses in generation or demand. These types of variations are know some time in advance. Other strategies that demand slow-moving power consumption profiles include project TERRE, imbalance chasing, DNO control signals, among many others that are known to those in the field.

In the past, it has not been considered possible for loads that engage in peak-price avoidance to participate at the same time in a frequency-responsive service. This prevents operators of such loads from enjoying the financial benefits of these markets. It also means that loads will tend to use their capacity to provide other services to the grid, which are compatible with the slow-moving function, reducing their ability to provide services such as FFR and therefore detracting from the quality of balancing service that may be provided to the grid. Similarly, a number of generators may be run with a variable capacity in order to input power to the grid in accordance with a slow-moving market function. Such generators have also, to date, been precluded from simultaneous participation in a frequency-responsive service such as FFR.

With this invention however, such loads and generators—specifically, those that have a capacity to store energy in some form—are able to engage in both practices simultaneously. This invention has different embodiments, depending on whether the component (load or generator) is operable with a fully variable power consumption or whether it is a binary component. The implementation of this invention in both situations will be described in detail below.

In overview though, a load will be able to participate freely in a practice such as FFR, which has a fast-moving variation in power consumption F(t), whilst at the same time aiming to follow a slow-moving strategy, provided small deviations from an ideal slow-moving power consumption are permitted. In order to ensure that deviations remain small, a slow-moving baseline power consumption B(t) must be derived such that, on average, total power consumed by the asset practising FFR will, with high probability, match the total power consumed were it not practising FFR and following the slow-moving strategy alone.

Reference to "high probability" above means that, for a load providing FFR for a fixed amount of time, as that time period tends to infinity, the probability tends to 1.

With the function B(t), the instantaneous total power consumed at time t by the load practising FFR can be written:

$$P(t) = B(t) + F(t)$$

That is, instantaneous power can be modelled as a superimposition of two functions: the slow-moving baseline function B(t) and the fast-moving FFR term F(t). Because of the various constraints on both the mean and instantaneous power fluctuation of a variable-speed asset providing FFR or of a binary asset that is participating as one of a group of assets providing a responsive load service, this model is valid, provided the correct algorithm is followed for deriving B(t).

The power consumption profile demanded by the slow-moving strategy, for example avoiding consumption at times of peak pricing will be termed the slow-moving demand profile and denoted D(t). Caution should be exercised with the straightforward approach: setting the baseline function B(t) equal to the slow-moving demand profile D(t), resulting in the total power consumed by the load being D(t)+F(t). If the deviation from the ideal demand profile is significant, then the cost will be too great for any rewards derived as a result of practising a strategy in accordance with F(t). Moreover, in the case of a binary load, errors will be significantly greater. Such a load can only be "on" or "off": if both strategies simultaneously require the load to be "on", superimposition will result in the load consuming twice its maximum power, clearly an impossible situation. The load is therefore forced to deviate from one of the strategies that it is following, which will most likely incur financial penalties.

The alternative approach followed by this invention is to use, instead of D(t), the derived function B(t) as the baseline power consumption profile. B(t) is constrained such that over a pre-determined period of time (a settlement period), the total amount of power consumed by the load has a high probability of being the same as that which would have been consumed had the load be operating in accordance with the slow moving demand profile. The period of time is selected such that it is much greater than a typical duration for which a frequency-responsive power adjustment is required and short in comparison with the length of time for which adjusted power consumption is required for the slow-moving demand profile. The duration of a frequency-responsive adjustment will, of course, depend on the details of the algorithm used but is typically around 1-3 minutes. The result is that the load is permitted to engage freely in FFR (for example) but it must also follow a baseline profile, which is subject to the constraints indicated above. If therefore the day is divided into a continuous sequence of settlement periods and this strategy is followed for each settlement period over the course of the day, it then follows that although there will be some short term deviations from the ideal slow-moving demand profile caused by participation in FFR, the consequences are minimised over each settlement period. The overall cost to the load participating in both power-adjustment strategies is therefore kept low.

As noted previously, the implementation of power consumption strategies that aim for minimal cost will differ depending on whether the load is operable with variable power consumption or must simply be either on or off. Examples of algorithms that are used in accordance with this invention in these different scenarios are set out separately below.

Variable Speed Demand Asset

A variable speed demand asset is a load that has the ability to consume electricity at a configurable rate. That is, its instantaneous power consumption is P(t), where $0 \leq P(t) \leq C_D$, $C_D$ being the maximum power consumption of the load.

With reference to FIG. 1 and the case of a variable-speed load 14, the steps in operating the load 14 such that it can simultaneously participate in two separate power-adjustment strategies will now be described. In preparation, the central demand server 30 is notified of or has access to a database in which is stored information of relevance to the slow-moving demand profile D(t). For peak-price avoidance, this will include the cost of electricity throughout the day. It will also include historical data that is specific to the load or type of load 14 that is being operated in accordance with this invention. These may be obtained from the local industrial process controller 20, and therefore specific to the load, or may be generically defined with respect to loads of the same type. Such data will include operational constraints such as, but not limited to, variation of stored energy reserves as a function of operating power. Further detail, in relation to exemplary industrial processes, will be described later. From this data, the central demand server calculates an optimised slow-moving demand profile D(t) that offers the lowest operational costs, subject to operational constraints of the load 14. This demand profile D(t) is derived under the assumption that this will be the only power-adjustment strategy in which the load will be participating. The central demand server 30 may be arranged to provide optimised demand profiles D(t) for one or more loads 14 that are connected to the network 18.

The optimised demand profile D(t) is transmitted over the network to the local responsive load controller 26 or to each local responsive load controller 26, if more than one load is being operated under the control of this demand server 30. The local responsive load controller 26, for a variable speed load, sets the baseline function B(t):

$$B(t) = C_D - \Delta, \text{ if } C_D - \Delta < D(t) \leq C_D;$$
$$B(t) = \Delta, \text{ if } 0 \leq D(t) < \Delta; \text{ and}$$
$$B(t) = D(t) \text{ otherwise.}$$

Where $\Delta$ is a small ($\ll C_D$) constant, the origin of which will become apparent later. To date, such a straightforward superimposition of D(t) and F(t) has been considered too costly. That is, it is somewhat surprising that this approach works. It is only when D(t) approaches zero or full operating power that it cannot be used directly as the baseline function and a small adjustment $\Delta$ is made. This small adjustment is only necessary in order to leave some headroom in the event of a responsive load demand being made during an off period or period of operation at maximum capacity.

The local frequency monitor 28 provides an indication of grid frequency to the responsive load controller 26. The local load controller 26 will, as is known in the art of responsive load services, calculate any adjustment to load power consumption that has to be made in accordance with a detected frequency deviation. That is, the local load controller 26 will calculate F(t).

The local responsive load controller 26 then instructs the local industrial process controller 20 to operate the load such that it withdraws power from the grid in accordance with a profile:

$$P(t) = B(t) + F(t).$$

This operating strategy allows the baseline consumption of the load to closely follow the slow-moving signal whilst, at the same time, permitting full participation in an FFR service. The baseline consumption only deviates from the slow-moving demand profile at such times that the load may be operating around full power or around zero power.

It is noted that the simultaneous participation in the two different services by operating a load in accordance with a superimposition of two power consumption profiles is dependent on the following three conditions being met:
The load is a variable-speed load and so there is no restriction on power adjustments that can be made, provided consumption is kept within limits;
The fast-moving function F(t) satisfies a low utilisation condition; and
F(t) satisfies a mean-reversion condition.

By low-utilisation, it is meant that whenever the asset is called on to provide the frequency-responsive service F(t), then the size of the power adjustment required is likely to be only a small fraction of the total available power. That is:

$$|F(t)| \leq \delta C_D$$

where, with high probability, $\delta \ll 1$.

In fact, it is recognised that in general, for a variable speed load, FFR utilisation rates are around 6%, which represents only a small perturbation on the power consumption profile of an asset. That is, the fraction of capacity used to provide FFR response is typically 6% of tendered FFR availability: $\delta \sim 0.06$. Other algorithms may be used to implement FFR (or other frequency-responsive service) that have differing utilisation rates but, provided $\delta \ll 1$, these other algorithms will still satisfy the low-utilisation condition.

Whilst the low-utilisation condition applies to the instantaneous frequency-responsive power adjustment, the mean-reversion condition relates to the behaviour of the response F(t) over an extended period of operation T. At any given instant of response, the F(t) adjustment may be positive (increased load) or negative (increased generation). Over the period of time T therefore, it follows that, on some occasions, the response adjustment will be positive and, on others, it will be negative. Ideally, over the course of a settlement period T, the responsive service will be energy neutral i.e. the mean value of F(t) will be zero. In practice, this is rarely the case and the mean value of F(t) over this period is bounded by a value $\varepsilon$. The mean-reversion condition requires that the mean value of the responsive power adjustments made over a settlement period T (i.e. $\varepsilon$) should, with high probability, be small as a fraction of utilised power. That is:

$$\frac{1}{T}\int_T F(t)dt \le \varepsilon$$

where, $\varepsilon \ll \delta \times C_D$.

That is, the mean responsive power adjustment throughout $\varepsilon$ is significantly less than the maximum likely power adjustment made at any point during the extended period T for a load with utilisation rate $\delta$.

The mean-reversion condition is satisfied primarily because F(t) will be positive at some times and negative at others during the course of a settlement period T.

It will be recalled that the baseline function B(t) is set, for a variable speed demand asset, to be equal to the slow-moving demand function D(t) unless the demand function approaches the maximum or minimum power consumption for the asset. If D(t) does approach these limiting values, B(t) is displaced from D(t) by an amount $\Delta$, the value of $\Delta$ being selected such that sufficient headroom is left for the asset to provide a frequency-responsive service F(t), if it is called upon to do so. If the asset satisfies the low-utilisation condition, then the value of F(t) is unlikely to exceed $\delta C_D$. $\delta \ll 1$ at any point in time. It therefore follows that $\Delta$ need only be set to $\delta C_D$ for the responsive service to be fully accommodated. As $\delta \ll 1$, it follows that $\Delta \ll C_D$ and so this adjustment to B(t) represents only a very small deviation from the ideal demand profile.

In alternative embodiments, the baseline function always follows the ideal demand function, even when this approaches $C_D$ or 0. In this scenario, at the times for which the load is operating near these limits, the load has to be removed from the portfolio of loads that are available to provide the balancing response. That is, if the baseline is $C_D$, the load cannot provide a balancing service in the event of a high frequency grid excursion, although it will still be available to reduce power consumption in response to a low frequency excursion. Similarly, if the load is operating at a zero power baseline, then it can no longer provide a responsive service to a low frequency excursion, although it will be available to participate in a response if grid frequency becomes too high Which of these alternative embodiments is preferred will largely be dictated by economic cost: whether the penalty for non-availability in the responsive load service exceeds the increased cost of deviation by an amount $\Delta$ from the ideal slow-moving demand function.

In general, the average power consumption of an asset that is left free to follow any responsive demands F(t) made on it and operated in accordance with a baseline function B(t) that follows the slow-moving demand profile over the period T ($\hat{P}_T$) is given by:

$$\hat{P}_T = \frac{1}{T}\int_T B(t)dt + \frac{1}{T}\int_T F(t)dt$$

As indicated above, the mean value of F(t) over the period T is less than or equal to the value $\varepsilon$, which is a small value, provided the mean-reversion condition holds. That is:

$$\hat{P}_T \le \frac{1}{T}\int_T B(t)dt + \varepsilon$$
$$\le \hat{B}_T + \varepsilon$$

where $\hat{B}_T$ is the mean value of the baseline term over this time period T. As $\hat{B}_T$ was derived to ensure it matched the ideal average slow-moving demand profile $\hat{D}_T$, it follows that the cost of operating the load 14 in accordance with this algorithm is a small deviation ($\varepsilon$) from an ideal average power-consumption profile. This represents an acceptable cost that will, in the vast majority of cases, be outweighed by the reward for participation in a responsive load service.

Non-Variable Speed Demand Asset

In a non-variable speed demand asset, the power drawn by the load may be only one of two values: zero or full operating capacity. Examples of such loads are compressors (for refrigeration) and relay-operated industrial heaters such as a bitumen tank. These loads cannot effectively participate in both peak-price avoidance and a frequency-responsive service such as FFR by a straightforward superimposition of both power consumption profiles. The asset is either on or off and so F(t) will equal $C_D$ when it is on and responding to FFR requirements.

As detailed above, the algorithm by which the baseline function B(t) was derived for the variable-speed asset required the fast moving function F(t) to satisfy a low-utilisation condition. That is, with high probability:

$$|F(t)| \le \delta C_D, \delta \ll 1$$

Clearly, in the case of a non-variable speed asset, this condition will no longer hold: $\delta=1$, if a responsive switch is required. Moreover, it is no longer possible to derive the baseline function B(t) in isolation from the unpredictable F(t). The condition $B(t)+F(t) \le C_D$ must be satisfied as the asset cannot be operated at more than full power and so B(t) must be responsive to changes in F(t). That is, a more complex algorithm is required to derive the baseline function B(t).

For a non-variable speed asset the mean-reversion condition does hold however. This is satisfied primarily as a result of two factors:

if F(t) is positive at some times and negative at others during the course of settlement period T; and if a single load participates as a member of a responsive group in the FFR (or similar) market then this load will, in all probability, only be called upon intermittently to provide a response, which in turn means that F(t) will be non-zero for only a small fraction of the time period T (provided the FFR algorithm underpinning group operation ensures a sufficiently even distribution of responses around the group).

For a load 14 that is a non-variable speed asset, the method for deriving the baseline function B(t) begins, as with the variable speed case: the central demand server 30 calculates an optimised slow-moving demand profile D(t) that offers the lowest operational costs, subject to operational constraints of the load 14. This demand profile D(t) is derived under the assumption that this will be the only power-adjustment strategy in which the load will be participating. The central demand server 30 may be arranged to provide optimised demand profiles D(t) for one or more loads 14 that are connected to the network 18.

Figure 3:
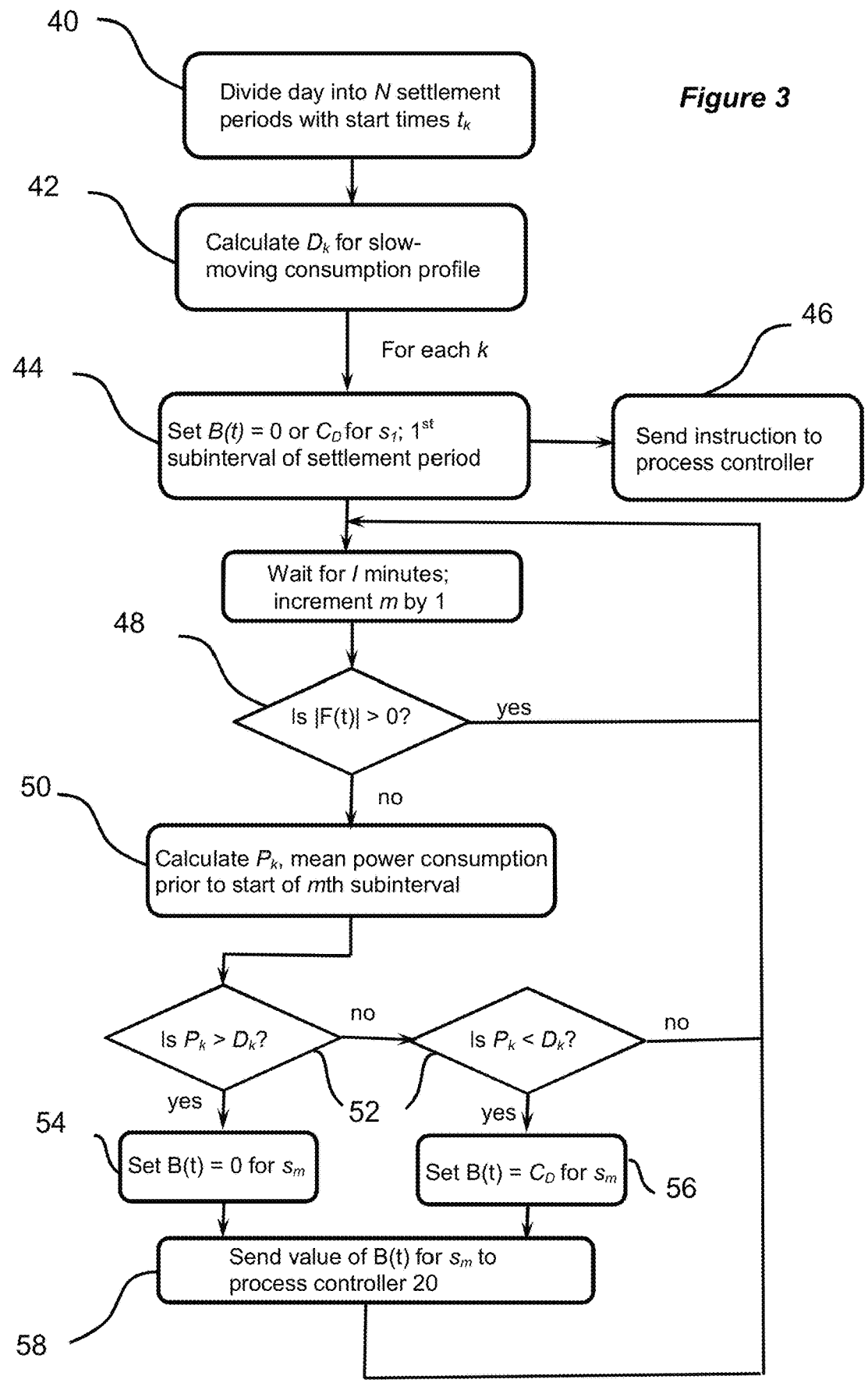
FIG. 3 is a flow chart representing process steps involved in implementing a dual power consumption strategy for electrical loads.

A flow chart illustrating the steps involved in implementing a power-consumption strategy that enables participation in both a fast-moving service F(t), for example FFR, and following the slow-moving demand profile D(t) derived by the central demand server 30, is set out in FIG. 3. For ease of reference, it will be assumed that the fast-moving service F(t) is FFR, although this is by way of example only and not limiting.

At a first step 40, the day is divided into N settlement periods with start times $t_k$, k=1, 2, ... N, N+1 ($t_{N+1}$ being midnight). There is no requirement for the length of each settlement period to be equal although, in practice, for FFR and peak-price avoidance a settlement period of 30 minutes is effective and in accordance with UK electricity market regulations.

At a second step 42, for each settlement period, the central demand server 30 calculates the average power consumption rate at which the load 14 would have been operating were it following the slow-moving demand profile only. That is, for the kth settlement period, the average demand power consumption rate $\hat{D}_k$ is given by:

$$\overline{D_k} = \frac{1}{t_{k+1} - t_k} \int_{t_k}^{t_{k+1}} D(t) dt$$

This mean demand profile $\hat{D}_k$, $\forall k$ is sent to the local responsive load controller 26.

Over the next sequence of steps, the local responsive load controller 26 derives a function $\hat{B}_k$ for each settlement period based on the requirement that over the length $T_k$ of the settlement period, the average power consumption of the load $T_k$ should be as close to $\hat{D}_k$ as possible. As indicated previously, the load 14 can either consume power at a rate $C_D$ or it is off. That is, at any given instant in time t, P(t) must be either 0 or $C_D$. In order therefore to constrain the average power consumption over the kth settlement period to $\hat{D}_k$, the load 14 must be on for the appropriate fraction of the period $T_k$. That is, derive B(t) such that over the kth settlement period $\hat{B}_k = \hat{D}_k$, $\forall k$.

The load is therefore driven in a modulated on/off pattern such that, over the length of the settlement period, the total duration of the "on" phases matches the desired slow-moving demand function.

In this derivation of B(t), the contribution of F(t) to the total power consumption is, as with the variable speed asset, ignored. For the variable speed asset, the cost was shown above to be a small deviation, ε, from the ideal demand power consumption profile. This cost was found to be acceptably low for situations in which F(t) satisfied the low-utilisation and mean-reversion condition. That is, if F(t) takes up only a small portion of the available power and is as likely to be positive as it is negative.

In the case of the non-variable speed asset F(t) must, if it is non-zero, take up all the available power. Deriving B(t) from $\hat{D}_k$ alone means that, for the kth settlement period:

$$\overline{P_k} = \frac{1}{t_{k+1} - t_k} \int_{t_k}^{t_{k+1}} B(t) dt + \frac{1}{t_{k+1} - t_k} \int_{t_k}^{t_{k+1}} F(t) dt$$

$$= \overline{D_k} + \frac{1}{t_{k+1} - t_k} \int_{t_k}^{t_{k+1}} F(t) dt$$

It can readily be seen that if the asset is required to provide an FFR response switch during this period, the contribution made by the F(t) term may be significant. It will not require much lengthening of the "on" time in response to an FFR requirement to increase demand such that, over the length of the settlement period, the average power consumption $\hat{P}_k$ is significantly larger than the ideal. Similarly, if the network imbalance requires reduced demand and a shortening of the "on" time for the asset during the settlement period, the value of $\hat{P}_k$ may be significantly less than required to follow the ideal slow-moving demand profile. The asset may not then be storing enough energy to see it through a peak pricing period. We therefore also need to derive B(t) by a method that takes into account the consequences of any FFR switch that is made during the settlement period.

At step 44, the local responsive load controller 26 begins its algorithm to calculate B(t) over the kth settlement period. Each settlement period is divided into modulation subintervals. A modulation subinterval of the kth settlement period begins at a time $s_j$ ($t_k \leq s_j < t_{k+1}$) and ends at a time $s_{j+1}$ ($s_j < s_{j+1} \leq t_{k+1}$). If the effect of F(t) were neglected then B(t) may, for example, be derived by switching the asset "on" for one subinterval, "off" for the next, "on", "off", etc. and setting the duration of the subintervals such that the fraction of the settlement period for which the asset is "on" leads to an average consumption of $\hat{D}_k$. Neglecting F(t) however causes errors to be introduced, which will only be compounded over subsequent settlement periods. To avoid this a system of dynamic allocation of subintervals is adopted.

For the first subinterval $s_1$, B($s_1$) is set 44 to either $C_D$ or 0 and the appropriate instruction sent 46 to the industrial process controller 20. This setting may be by random allocation or by following an initial rule such as B($s_1$)=$C_D$ if $\hat{D}_k \geq 0.5 \, C_D$ and 0 otherwise. Every l minutes thereafter, the method executes one subinterval allocation loop. That is, the value of B(t) is determined for the next (mth) subinterval. This begins at step 48 with the local responsive load controller checking whether the load 14 is currently providing a responsive load service. If it is, nothing is changed and the load 14 is left free to participate in FFR for the next subinterval. If no FFR requirement is being placed on the load 14 then, at step 50, the average total power consumption of the load over all previous subintervals of the kth settlement period is either calculated or otherwise obtained by the responsive load controller 26. For the mth subinterval, the average total power consumption up until this subinterval is given by:

$$\overline{P_k} = C_D \frac{\sum_{j=1}^{m-1} \lambda_j (s_{j+1} - s_j)}{\sum_{j=1}^{m-1} s_{j+1} - s_j}$$

Where $\lambda_j$ is a function that has a value of 1 if the load is "on" for the jth subinterval and 0 if it is not.

This value of the average power consumption of the load for the settlement period up until that point may be obtained in a number of ways. In the case of FFR, the industrial process controller 20 continuously monitors load power consumption and provides this real data to the responsive load controller 26, which enables the responsive load controller 26 to extract the information required. In other implementations, the responsive load controller 26 is configured to store the instructional data that it communicates to the industrial process controller 20. The responsive load controller 26 may then use this stored, historic data to calculate the average total power consumption of the load over all previous subintervals, assuming that it has been operated in accordance with these instructions. If, for some reason, the industrial process controller 20 overrides the responsive load controller 26, for example if the stored energy reserves are insufficient, this information is communicated by the industrial process controller 20, allowing the responsive load controller 26 to adjust the calculation accordingly.

At step 52 the mean power consumption to date ($\hat{P}_k$) is compared with the ideal mean power that the load 14 would have consumed, had it been operating in accordance with the slow-moving demand profile only ($\hat{D}_k$). If the load 14 is using too much power then, at step 54, B(t) is set to 0 for the mth subinterval. If, on the other hand, insufficient power has been demanded by the load 14, then B(t) is set 56 to $C_D$ for the mth subinterval. In either case, the value of B(t) for the subinterval is sent 58 by the responsive load controller 26 to the local process controller 20. For the duration of the mth subinterval, the local process controller 20 will ensure the load 14 operates in accordance with the determined value of B(t), unless this is overridden by any FFR requirement. If, at step 52, the mean power consumption is found to be equal to the ideal demand function then no action is taken. The process then waits a further l minutes until repeating the subinterval allocation loop 48-58, to determine B(t) for the (m+1)th subinterval and operation of the load 14 instructed accordingly.

This procedure continues until the end of the settlement period.

If B(t) is determined in accordance with this algorithm, then it is effectively adjusted to compensate for F(t) so that, with high probability, $\hat{P}_k$ is maintained close to its desired value. The subinterval length is selected in accordance with the duration of the settlement period and perhaps also by the requirements of the particular load 14.

Clearly, as with the variable-speed asset, there will be some cost in terms of deviation from the slow-moving demand function by allowing participation in a fast-moving response service such as FFR. This cost needs to be determined: if it is too large, loads that routinely operate a strategy such as peak-price avoidance may not be willing to adopt this technique to enable participation in both this and FFR simultaneously.

As noted above, the low-utilisation condition will not hold for non-variable speed assets. However, for a group of assets participating in FFR in accordance with the algorithm described in, for example, WO 2006/128709, the time elapsed since a particular asset is required to adjust its energy consumption in response to grid frequency deviation is taken into account in determining its likelihood of response to future deviations. This has the consequence that, over a sufficiently large period of time, S, the FFR response will represent a relatively small perturbation in respect of normal operating behaviour. It therefore follows that the total power consumption change arising through the FFR response over the period of time S will also be small. That is:

$$\int_S F(t)dt \le \|S\|\delta C_D$$

Whereby there will exist a value of S such that $\delta \ll 1$. This weak low-utilisation condition, which follows when FFT interruptions to the baseline are infrequent, means that the dynamic allocation of $\{0; C_D\}$ values for each subinterval, as described in relation to FIG. 3, allows B(t) to be derived such that an error introduced in one (or more) subintervals by a requirement to provide a frequency-responsive service is, with high-probability, corrected in subsequent subintervals.

Without giving any consideration to F(t), it can be seen that following the allocation rules set out in FIG. 3, the tendency will be for the average power consumption for the settlement period $T_k$ to track towards the value $\hat{D}_k$. For example, consider the situation in which the ideal demand is $0.7C_0$. The algorithm will cause the load to run following the modulation pattern set out in Table 1 below:

TABLE 1

| subinterval | Operating power | $\hat{P}_k$ (% $C_D$) at end |
|---|---|---|
| $s_1$ | $C_D$ | 100% |
| $s_2$ | 0 | 50% |
| $s_3$ | $C_D$ | 67% |
| $s_4$ | $C_D$ | 75% |
| $s_5$ | 0 | 60% |
| $s_6$ | $C_D$ | 67% |
| $s_7$ | $C_D$ | 71% |
| $s_8$ | 0 | 62% |
| $s_9$ | $C_D$ | 67% |
| $s_{10}$ | $C_D$ | 70% |
| $s_{11}$ | $C_D$ | 73% |

As can be seen, the value of $\hat{P}_k$ may vary significantly over the first few modulation subintervals but it tends to oscillate about the ideal value of 70% in later subintervals. Subsequent subintervals will offer increasingly small percentage changes to $\hat{P}_k$, as the operational power of the load in each subinterval represents a smaller fraction of the total power consumed.

If at any point the load is required to undertake an FFR switch and F(t) is non-zero, then the algorithm modulates operation of the load so as to compensate. Again, the greater the number of subintervals that follow the subinterval in which the switch occurred, the better the recovery towards $\hat{D}_k$.

For example, consider the situation in which the load, attempting to follow an average demand profile of $0.7C_D$ as above, is required to undergo an FFR switch to 0 power for half of the duration of the 6th subinterval $s_6$. Load behaviour will then be as set out in Table 2 below.

TABLE 2

| subinterval | Operating power | $\hat{P}_k$ (% $C_D$) at end |
|---|---|---|
| $s_1$ | $C_D$ | 100% |
| $s_2$ | 0 | 50% |
| $s_3$ | $C_D$ | 67% |
| $s_4$ | $C_D$ | 75% |
| $s_5$ | 0 | 60% |
| $s_6$ | $0.5C_D$ | 58% |
| $s_7$ | $C_D$ | 64% |
| $s_8$ | $C_D$ | 69% |
| $s_9$ | $C_D$ | 72% |
| $s_{10}$ | 0 | 65% |
| $s_{11}$ | $C_D$ | 68% |

As can be seen, the average power differs after the switch but, following the 7th subinterval, which is the first that can compensate, the average power consumption rate stays within 6% of its ideal value.

It will be understood that this is just one specific example given to clarify the behaviour of this algorithm in compensating for the load providing a responsive load service in addition to following the slower-moving demand profile. The general principle applies though: an F(t) switch will be compensated within a few subintervals; the more subintervals there are in a settlement period, the better the convergence of the mean power consumed in that period towards the mean value of the slow-moving demand function.

Returning to the derivation of the average baseline function $\hat{B}_k$ for the kth settlement period, it will be recalled that this was set to equal the average value of the slow-moving demand function over this period, $\hat{D}_k$. If however the ideal slow-moving demand profile approaches the limiting values of 0 or $C_D$ for this period, then there is no capacity remaining for participation in FFR (or at least not in one direction). For the variable-speed asset, if the demand function D(t) approached either limit, B(t) was set at a value $\delta C_D$ away from the limit. For the non-variable speed asset, a similar approach is used when deriving $\hat{B}_k$. In this case however, as it is the average value of the baseline function that is of most concern, the more appropriate adjustment factor to use in this instance is the average value of the frequency-responsive function $\hat{F}_k$ over this settlement period. This is the quantity $\varepsilon$, derived above. Provided the mean-reversion condition holds, $\varepsilon$ is a relatively small value $\ll C_D$.

The settlement period used in the above calculations is set at 30 minutes. This is largely because it fits with UK energy market regulations. A longer or shorter period could also be used, provided that it remains significantly longer than a typical FFR switch length. Making the settlement period longer has no impact because although there will be a longer time in which to correct the baseline function in response to FFR, there will be more FFR switches to correct. The worst-case scenario in which an FFR switch occurs at the end of a settlement period will arise with similar frequency. Shorter settlement periods also have little effect unless the length approaches the length of a typical FFR switch. In this situation, there will be insufficient time to correct for the effects of any FFR switch.

Electricity-Generating Assets

Although the algorithms above are described in terms of their application to demand assets, it will be clear to one skilled in the art that they are equally applicable to generators. There are financially preferred times at which a generator feeds energy to the grid and this can provide a slow-moving demand profile. Generators that can raise or lower their output can, at the same time, participate in a responsive service if they follow the algorithms described herein, with appropriate adjustment for the direction of electricity flow.

Load Energy-Storage Examples

In implementing the above-described algorithms (in both the variable speed and non-variable speed cases), it is important to keep track of the energy reserves stored in the asset. The asset can only be permitted to engage in any variable consumption strategy if it has sufficient reserves to operate at a non-ideal energy consumption for the time period required.

With reference again to FIG. 1, the industrial process controller 20 includes or is in communication with the detector 24 that is arranged to monitor a parameter that is indicative of the energy reserves stored within the load. That is, for each generator or load system that is operated in accordance with this invention, it is necessary to derive a measurable parameter of the system that acts as a "proxy" for the energy that is stored within the system and that is held in reserve to allow operation in accordance with variable power consumption strategies. This proxy variable is monitored by the detector and communicated to the industrial process controller 20 If the proxy variable exceeds safe limits, the industrial process controller 20 overrides the responsive load controller 26 and returns the load (or generator) to its ideal operational power level.

Some non-limiting examples of proxy variables will now be described for different systems that may be included in a portfolio of assets operating in accordance with this invention. By analogy with a battery energy storage system and measurement of its State of Charge (SoC), the proxy variable for each alternative system will be a real number between 0 and 1, which represents the fraction of storable energy that is currently stored within the system.

A bitumen tank is an insulated cylindrical container that is partially filled with liquid bitumen. For reasons of safety and quality assurance, the temperature of the tank must be maintained between a lower threshold $T_{min}$ and an upper threshold $T_{max}$. Bitumen tanks are generally highly insulated and this enables them to store energy for extended periods of time by converting this energy to heat, provided the temperature of the bitumen remains between $T_{min}$ and $T_{max}$. In this case, the temperature of the tank and threshold temperatures can be used to define a suitable proxy variable $$\phi(T) = \left(\frac{T - T_{min}}{T_{max} - T_{min}}\right)$$

Building Management Systems are typically configured with a temperature setpoint $T_{set}$, which corresponds to the ideal temperature at which the building is to be maintained. In practice, the temperature will be allowed to fall or rise an amount $\Delta T$ below or above this set point without the system altering its behaviour. That is, the system has an effective deadband extending from $T_{set}-\Delta T$ to $T_{set}+\Delta T$ that allows the energy stored within the system to varied. If the heating system is on, raising the temperature such that it enters the deadband, the heating will not be turned off until the temperature is sufficiently high so as to exit the deadband. We can therefore use the current building temperature T, setpoint $T_{set}$ and width of the deadband $2\Delta T$ to define a proxy variable for this system $\phi$:

$$\phi(T) = \left(\frac{T - T_{set} + \Delta T}{2\Delta T}\right)$$

An Activated Sludge Process (ASP) is a type of industrial process that is used in wastewater treatment. It involves the biological digestion of the organic content and pollutants in sewage by bacteria and protozoa. Air or oxygen is blown into the raw sewage, which is seeded with bacteria. Various parameters are monitored and controlled during the process:

the level of dissolved oxygen must be maintained to support the bacteria;

the Sludge Volume Index provides an indication of the settling characteristics of the sludge; and the level of ammonia, which is a sewage pollutant, provides an early indication of the need for any process adjustment due to the environmental sensitivity of nitrifying bacteria.

Arguably, the level of ammonia is the most important variable as it is linked to significant financial penalties if authorised levels are breached. For this reason, the simplest proxy variable to use for variable-power operation of an ASP is based on the current ammonia level L and the maximum permissible limit $L_{max}$:

$$\phi(L) = \left(\frac{L_{max} - L}{L_{max}}\right)$$

In these processes however the level of dissolved oxygen D is also critical: if it falls too low, bacteria may die and lower concentrations of bacteria reduce the efficiency of the process. If the case for variable demand were based on the level of ammonia alone, a situation may arise in which the ammonia level is low allowing the process to be switched off for a period of time. However, during this "off" time, oxygen will no longer be blown into the sludge, resulting in a reduction in oxygen levels as it gets used up by the bacteria. This obviously risks bacteria dying, which has a severe impact on the water treatment process.

If there are two (or more) critical parameters that must be taken into account in defining safe operational limits for a process, it is necessary to define a compound proxy variable. In this instance, a proxy variable for dissolved oxygen level alone should also be derived. In order to reflect the rapidity with which low dissolved oxygen levels can become damaging to bacteria, the proxy function is constructed such that as the dissolved oxygen level D approaches its minimum threshold value $D_{min}$, the function rapidly approaches zero. If the oxygen levels are far from the threshold, the proxy variable is close to 1. A suitable function is;

$$\phi(D) = 1 - e^{Cmax(D-D_{min},0)}$$

where C is a constant that is used to parameterise how aggressively the function should approach zero.

The proxy value indicating the fraction of energy stored in this whole system as a fraction of available energy is then set to be the product of the two proxy functions:

$$\phi(L, D) = \phi(L) \cdot \phi(D) = \left(\frac{(L_{max} - L)(1 - e^{Cmax(D-D_{min},0)})}{L_{max}}\right)$$

The examples demonstrate how a proxy state of charge variable can be derived in order to provide an indicator of the instantaneous ability of the industrial system to adjust its power consumption to enable participation in strategies that take advantage of electricity market conditions. Clearly, the details of the indicator will depend on the specifics of the industrial process concerned: which is the dominant variable that can be used to indicate the ability of the process to use its own resources when not drawing power from the grid? In systems such as the ASP, the variable used is a product of two different process parameters. This approach can be extrapolated to processes in which two, three or more indicators must be maintained between, above or below determined thresholds.

The proxy state of charge $\phi$ is a parameter that may prove useful to many elements of the above-described embodiments of this invention. This single parameter will give a ready indication of stored energy reserves and therefore the ability of a load 14 to be responsive to power adjustments required to address network imbalances. Following the variation in the proxy state of charge $\phi$ for a particular load 14 over time, allows this to be mapped to load power consumption. This will enable the central demand server 30 to tailor the slow-moving demand profile that is provided to each load based on the requirement that the proxy state of charge $\phi$ for that load should be maintained within a defined range. This, in turn, ensures that the load is operating within its normal operating range despite any power adjustments made in accordance with network conditions. Moreover, monitoring the proxy state of charge $\phi$ allows the determination by the industrial process controller 20 as to when the load 14 is to be made unavailable for the responsive load service i.e. when it will override commands from the local load controller 26. Finally, it provides a single parameter that enables implementation of a responsive load service in accordance with a single algorithm, regardless of the details of the industrial processes being operated by each load within a portfolio.

Although the embodiments of this invention described above have all been implemented using loads that adjust power consumption in response to market conditions, it applies equally to generators that are capable of adjusting power fed into a network in response to market conditions. For example, water treatment plants that are based on anaerobic digestion of sewage result in the production of biogas. This biogas is converted by gas engines to electrical and thermal energy and any electrical energy that is obtained in excess of that required to operate the plant is sold to the grid. Many such generators are fitted with buffering technology, such as a gas bag. The quantity of gas that has been buffered is an indication of the potential of the generator to provide electricity. Moreover the buffered gas is required to be kept below a threshold pressure, which limits the energy storage capacity. That is, this parameter may be used as the proxy state of charge variable for this system. The process may therefore be monitored as it operates simultaneous power generation strategies in accordance with this invention.

The invention claimed is:
1. A method of controlling operation of a component connected to an electricity supply network, the component being either a generator or load of a type that is able to store energy within and is operable at a range of power levels between zero and a maximum power $C_D$, the method comprising the steps of:
   (a) operating the component over a time period such that, within the time period, adjustments are made to a rate at which energy is transferred between the component and the supply network in accordance with a baseline power function B(t); and
   (b) simultaneously operating the component over the time period such that adjustments are, in addition, made to the rate at which energy is transferred between the component and the supply network in accordance with a fast-moving power function F(t), such that the fast-moving power function F(t) is superimposed on the baseline power function, wherein
      the baseline power function B(t) is derived from a slow-moving power function D(t), the baseline power function B(t) is set such that it is equal to the slow-moving power function D(t), provided that D(t) is not within a range $\delta C_D$, $\delta \ll 1$ of either 0 or the maximum power $C_D$; and, if D(t) is within this range, B(t) is set to either $\delta C_D$ or $(1-\delta)C_D$ respectively, wherein
      if adjustments are made to the rate at which energy is transferred between the component and the supply network in accordance with the slow-moving power function D(t), the component would benefit economically from a variation in a prevailing price of electricity on the network or a variation in a value that can be derived, directly or indirectly, from the supply of electricity on the network, and adjustments made to the rate at which energy is transferred between the component and the supply network in accordance with the fast-moving power function F(t) are adjustments that are responsive to and such as to counter imbalances between power generation and power consumption over the electricity supply network, the adjustments being less than the maximum power $C_D$.

2. The method as claimed in claim 1, wherein:

the component is a binary component that is either "off" or "on" and so operable only at two power levels: 0 and $C_D$;

the component is one of a group of components that are together operated to provide a service that is responsive to network imbalances, with responsibility for response being distributed around the group such that each component will only provide the responsive service intermittently; and the baseline power function B(t) is derived both from the slow-moving power function D(t) and also from past values of the fast-moving power function F(t).

3. The method as claimed in claim 2, wherein the time period comprises a sequential series of settlement periods and, for each settlement period k=1 to N, following determination of the average value $\hat{D}_k$ of the slow-moving power function D(t) over that settlement period, the baseline function B(t) is derived using the steps of:

(c) dividing the settlement period $T_k$ into a sequential series of subintervals;

(d) for each subinterval period $s_m$, m=1 to M if, at the start of the subinterval period $s_m$, the component is not responding to a network imbalance:

(i) determine the average total power transfer $\hat{P}_k$ between the component and the supply network prior to the start of that subinterval period;

(ii) compare the average total power transfer $\hat{P}_k$ prior to the subinterval and determined in Step (b)(i) with the average value $\hat{D}_k$ of the slow-moving power function D(t) over the settlement period; and (iii) if $\hat{P}_k > \hat{D}_k$ set the baseline function B(t) for that subinterval to zero; if $\hat{P}_k < \hat{D}_k$ set the baseline function B(t) for that subinterval to the maximum power $C_D$.

4. The method as claimed in claim 3, wherein if, at the start of the subinterval period $s_m$ the component is responding to a network imbalance, the baseline power function B(t) for the subinterval period $s_m$ is set to the same value as the baseline power function B(t) for the immediately preceding subinterval $s_{m-1}$.

5. A method of controlling operation of a component connected to an electricity supply network, the component being either a generator or load of a type that is able to store energy within, the method comprising the steps of:

(a) monitoring a physical parameter of the component that is indicative of the energy reserves stored within;

(b) if the parameter has a value that is between an upper threshold limit and a lower threshold limit, controlling operation of the component in accordance with the method set out in claim 1; and (c) if the parameter has a value that is outside the upper or lower threshold limits, operating the component with an operating power that is in accordance with returning the parameter to a value between the upper and lower threshold limits.

6. The method as claimed in claim 5, wherein a proxy variable φ, 0≤φ≤1, is derived for the component, the proxy variable representing the fraction of stored energy held in the energy reserves at any point in time and being derived from the measured physical parameter, whereby threshold limits of component operation are defined in terms of the proxy variable.

7. The method as claimed in claim 1, wherein the component is a generator.

8. The method as claimed in claim 1, wherein the component is a load.

9. A local device controller associated with an industrial process controller arranged to exert direct control over operation of a component connected to an electricity supply network, the component being either a generator or load of a type that is able to store energy within, the local device controller being arranged:

to receive a signal indicative of imbalances in power supplied over the network from an indicator and to receive a slow-moving power function D(t) from a central server;

to derive a baseline power function B(t) from the slow-moving power function D(t), to derive a fast-moving power function F(t) from the signal indicative of imbalances in power supplied over the network; and to provide the industrial process controller with instructions to operate the component such that adjustments are made to a rate at which energy is transferred between the component and the supply network in accordance with the fast-moving power function F(t) superimposed on the baseline power function B(t); wherein the slow-moving power function D(t) is derived such that if adjustments are made to the rate at which energy is transferred between the component and the supply network in accordance with this function D(t), the component would benefit economically from a variation in the price of electricity distributed by the network during the course of a day, and wherein the component is operable at a range of power levels between zero and a maximum power $C_D$ and the controller is further arranged to derive the baseline power function B(t) by setting it equal to the slow-moving power function D(t).

10. The controller as claimed in claim 9, wherein the component is operable at a range of power levels between zero and a maximum power $C_D$ and the controller is further arranged to derive the baseline power function B(t) by:

setting $B(t) = \delta C_D$ if $0 \le D(t) < \delta C_D$, setting $B(t) = (1-\delta)C_D$ if $(1\delta)C_D < D(t) \le C_D$; and setting $B(t) = D(t)$ otherwise.

11. The controller as claimed in claim 9, wherein:

the component is a binary component that is either "off" or "on" and so operable only at two power levels: 0 and $C_D$;

the component is one of a group of components that are together operated to provide a service that is responsive to network imbalances, with responsibility for response being distributed around the group such that each component will only provide the responsive service intermittently; and the controller is further arranged to derive the baseline power function B(t) from both the slow-moving power function D(t) and past values of the fast-moving power function F(t).

12. The controller as claimed in claim 9, wherein the baseline power function B(t) is derived from the slow-moving power function D(t) by first determining the average value $\hat{D}_k$ of the slow-moving power function D(t) over a settlement period $T_k$ and then:

(a) dividing the settlement period $T_k$ into a sequential series of subintervals;

(b) for each subinterval period $s_m$, m=1 to M if, at the start of the subinterval period $s_m$, the component is not responding to a network imbalance:

(i) determine the average total power transfer $\hat{P}_k$ between the component and the supply network in the settlement period $T_k$ prior to the start of that subinterval period;

(ii) compare the average total power transfer $\hat{P}_k$ prior to the subinterval and determined in Step (b)(i) with the average value $\hat{D}_k$ of the slow-moving power function D(t) over the settlement period; and (iii) if $\hat{P}_k > \hat{D}_k$ set the baseline function B(t) for that subinterval to zero; if $\hat{P}_k < \hat{D}_k$ set the baseline function B(t) for that subinterval to the maximum power $C_D$.

13. The controller as claimed in claim 12, wherein if, at the start of the subinterval period $s_m$ the component is responding to a network imbalance, the controller is arranged to set the baseline power function B(t) for the subinterval period $s_m$ to the same value as the baseline power function B(t) for the immediately preceding subinterval $s_{m-1}$.

14. The controller as claimed in claim 9, wherein the component is a generator.

15. The controller as claimed in claim 9, wherein the component is a load.

\* \* \* \* \*